United States Patent [19]
Hakamata

[11] Patent Number: 5,218,195
[45] Date of Patent: Jun. 8, 1993

[54] SCANNING MICROSCOPE, SCANNING WIDTH DETECTING DEVICE, AND MAGNIFICATION INDICATING APPARATUS

[75] Inventor: Kazuo Hakamata, Kanagawa, Japan

[73] Assignee: Fuji Photo Film Co., Ltd., Kanagawa, Japan

[21] Appl. No.: 899,279

[22] Filed: Jun. 16, 1992

[30] Foreign Application Priority Data

Jun. 25, 1991 [JP] Japan .................................. 3-153065
Jul. 16, 1991 [JP] Japan .................................. 3-175156

[51] Int. Cl.$^5$ .............................................. H01J 3/14
[52] U.S. Cl. .................................. 250/216; 250/234; 359/386
[58] Field of Search ................ 250/234, 216; 359/385, 359/386; 356/352, 392, 401

[56] References Cited

U.S. PATENT DOCUMENTS

| | | | |
|---|---|---|---|
| 5,043,570 | 8/1991 | Takabayashi | 250/216 |
| 5,065,008 | 11/1991 | Hakamata et al. | 250/216 |
| 5,081,350 | 1/1992 | Iwasaki et al. | 250/234 |
| 5,132,526 | 7/1992 | Iwasaki | 250/201.3 |
| 5,162,648 | 11/1992 | Iwasaki | 250/216 |

FOREIGN PATENT DOCUMENTS 62-217218  9/1987  Japan .

Primary Examiner—David C. Nelms
Assistant Examiner—T. Davenport
Attorney, Agent, or Firm—Sughrue, Mion, Zinn Macpeak & Seas

[57] ABSTRACT

A single processing device samples a serial output of a photodetector for detecting a light beam radiated out of a sample and generates a digital image signal, which corresponds to each main scanning line of a light beam irradiated by an optical system onto the sample. Pixel clock pulses are fed into the signal processing device, the period of the pulses being modulated so as to compensate for fluctuations in a speed, at which the optical system is moved by a movement mechanism with respect to a sample supporting member. A timing signal that determines the timing, with which the sampling process is begun, is generated. A grid pattern constituted of light reflecting or blocking members arrayed in the direction, along which the optical system is moved reciprocally with respect to the sample supporting member, is secured to the sample supporting member or the optical system. A light projector is associated with the optical system or the sample supporting member and irradiates a light beam to the grid pattern. A light receiver detects the light beam reflected by the grid pattern or having passed through the grid pattern. A signal generated by the light receiver is sampled in accordance with the pixel clock pulses, and a digital displacement signal is thereby generated. The phase of a drive signal fed into the movement mechanism is shifted with respect to the phase of the timing signal in accordance with the digital displacement signal.

9 Claims, 7 Drawing Sheets

SCANNING MICROSCOPE, SCANNING WIDTH DETECTING DEVICE, AND MAGNIFICATION INDICATING APPARATUS

BACKGROUND OF THE INVENTION

1. Field of the Invention

This invention relates to an optical type scanning microscope. This invention particularly relates to a scanning microscope, wherein an optical means, which irradiates a light beam to a sample, is moved with respect to a sample supporting member, on which the sample is supported, such that the light beam may scan the sample. This invention also relates to a device for detecting a scanning width, i.e., a width over which a light beam, or the like, scans a material, in an apparatus in which the material is scanned with the light beam, or the like. This invention additionally relates to a magnification indicating apparatus for a scanning microscope, such as an optical type scanning microscope or a scanning electron microscope, wherein an actual width of scanning with a probe is detected, and a magnification of the microscope is indicated in accordance with the detected scanning width.

2. Description of the Prior Art

Optical type scanning microscopes have heretofore been used. With the scanning microscope, a light beam is converged to a small light spot on a sample, and the sample is two-dimensionally scanned with the light spot. Light radiated out of the sample during the scanning (i.e., light which has passed through the sample, light which has been reflected from the sample, the fluorescence which is produced by the sample, or the like) is detected by a photodetector. An enlarged image of the sample is thereby obtained. An example of the scanning microscope is disclosed in Japanese Unexamined Patent Publication No. 62(1987)-217218.

In the conventional optical type scanning microscopes, a mechanism which two-dimensionally deflects a light beam by a light deflector is primarily employed as the scanning mechanism.

However, the scanning mechanism described above has the drawback in that a light deflector, such as a galvanometer mirror or an acousto-optic light deflector (hereinafter referred to as "AOD"), which is expensive must be used. Also, with the scanning mechanism described above, a light beam is deflected by a light deflector. As a result, the angle of incidence of the deflected light beam upon an objective lens of the light projecting optical means changes momentarily, and aberration is caused to occur. Therefore, the scanning mechanism described above also has the problem in that it is difficult for the objective lens to be designed such that aberration can be eliminated. Particularly, in cases where an AOD is utilized, astigmatism occurs in the light beam radiated out of the AOD. Therefore, in such cases, a special correction lens must be used, and the optical means cannot be kept simple.

In order to eliminate the aforesaid problems, a scanning mechanism has heretofore been proposed wherein a light beam is not deflected but a sample is scanned with the light spot of the light beam. For example, in U.S. Pat. No. 5,081,350, a novel mechanism has been proposed wherein a light projecting optical means is supported on a movable member, the movable member is moved reciprocally with respect to a sample supporting member, and a light spot of a light beam is thereby caused to scan a sample.

In U.S. Patent application Ser. No. 735,734, the applicant has proposed a movement mechanism for moving an optical means with respect to a sample supporting member. The proposed movement mechanism comprises a tuning fork having an end, on which an optical means or a sample supporting member is supported, and an excitation means composed of an electromagnet for applying a magnetic field, the intensity of which changes periodically, to the tuning fork, and thereby causing the tuning fork to vibrate. The proposed movement mechanism is advantageous over a movement mechanism utilizing, for example, a piezo-electric device or an ultrasonic vibrator, in that the width, over which the optical means moves with respect to the sample supporting member, i.e. the width, over which the light beam scans the sample, can be kept large. (The width, over which the light beam scans the sample, is determined by the amplitude of the tuning fork.) Therefore, when the proposed movement mechanism is employed in a scanning microscope, an image of a large area of the sample can be formed.

In most of conventional scanning microscopes, light radiated out of a sample (i.e., light which has passed through the sample, light which has been reflected from the sample, the fluorescence which is produced by the sample, or the like) is detected by a photodetector, and a serial output generated by the photodetector is fed into a signal processing means. The signal processing means samples and quantizes the output received from the photodetector. In this manner, image signal components of a digital image signal are obtained which correspond to respective positions lying along each main scanning line on the sample.

However, in such cases, if a light beam scanning mechanism, which is composed of a tuning fork and an electromagnet, is utilized, problems may occur in that a distortion occurs in an image which is reproduced from the digital image signal. This is because the displacement of the tuning fork does not change linearly with respect to time but changes in accordance with characteristics close to a sine function. Such problems also occur when a light beam scanning mechanism other than the light beam scanning mechanism composed of a tuning fork and an electromagnet is utilized.

In order to cope with the problems described above, it is considered to modulate the period of pixel clock pulses that determines the period, with which the output of a photodetector is sampled, so as to compensate for fluctuations in the speed, at which an optical means is moved reciprocally with respect to a sample supporting member. Such a method is effective, but it has the problem in that, if the relationship between the operation of the tuning fork (i.e., the movement of the optical means with respect to the sample supporting member) and the timing, with which the sampling process is begun, is not accurately kept at predetermined relationship, a distortion occurs in an image reproduced from the digital image signal.

The aforesaid scanning mechanism, wherein a light beam is not deflected but a sample is scanned with the light spot of the light beam, is broadly applicable to optical type scanning microscopes, scanning electron microscopes, scanning tunnel microscopes, light beam scanning read-out apparatuses, or the like. In such a scanning mechanism, a movement mechanism composed of a tuning fork and an electromagnet for resonating the tuning fork, a movement mechanism composed of a piezoelectric device, a movement mechanism composed of an ultrasonic vibrator, or the like, is often utilized in order to move a scanning means (e.g., a probe, on which a light projecting optical means, a stylus, or the like is supported, in cases where the scanning mechanism is employed in a scanning microscope) reciprocally and quickly with respect to a material which is to be scanned. In cases where such a movement mechanism is employed, the width, over which the scanning means moves reciprocally with respect to the material to be scanned, changes comparatively easily due to fluctuations in the drive voltage applied to the movement mechanism, or the like. If the width, over which the scanning means moves reciprocally with respect to the material to be scanned, changes, the width over which the light beam scans the material will change inevitably.

In cases where the scanning mechanism is employed in a scanning microscope, if the width over which the light beam scans the material changes, the magnification, with which a microscope image is formed, will deviate from a designed value. In cases where the scanning mechanism is employed in a light beam scanning read-out apparatus, if the width over which the light beam scans the material changes, the size of an image, which has been read out from the scanned material, will fluctuate. In order to eliminate such problems, it is necessary that the actual width, over which the light beam scans the material, is detected by a certain means. In accordance with the detected scanning width, the magnification of the microscope image should be indicated, or the operation of the scanning mechanism should be corrected such that the scanning width may be kept at a predetermined value.

As one of scanning width detecting devices for detecting the actual width, over which a light beam scans a material, there has heretofore been known a device comprising:

i) a grid pattern, which is combined with either one of a material to be scanned and a scanning means and which is constituted of a plurality of light reflecting members or light blocking members standing side by side with one another in a direction, along which the scanning means is moved reciprocally with respect to the material to be scanned, ii) a light projector, which is combined with the other of the material to be scanned and the scanning means and which irradiates a light beam to the grid pattern, iii) a light receiver for detecting the light beam, which has been reflected by the grid pattern, or the light beam, which has passed through the grid pattern, and iv) a means for counting the number of periodical fluctuations in a light beam detection signal, which has been generated by the light receiver.

In the scanning width detecting device fluctuations in described above, the number of periodical the light beam detection signal represents the number of the light reflecting members or the light blocking members, across which the light beam irradiated from the light projector to the grid pattern has moved. Therefore, the width, over which the light beam scans the material, can be detected by counting the number of periodical fluctuations in the light beam detection signal. For example, in cases where the grid pattern is constituted of a plurality of the light reflecting members, and the light receiver detects the light beam, which has been reflected by the light reflecting members, the light beam detection signal generated by the light receiver periodically rises pulse-wise. Therefore, the actual width, over which the light beam scans the material, can be detected by counting the number, N, of the pulse-wise rising points in the light beam detection signal and multiplying the pitch, p, at which the light reflecting members of the grid pattern stand side by side with one another, by the number, N.

However, with the scanning width detecting device described above, errors easily occur in detecting the width, over which the light beam scans the material. Therefore, the scanning width detecting device described above cannot always be employed when the width, over which the light beam scans the material, is to be detected very accurately. How such errors occur will be described hereinbelow. By way of example, the number, N, is counted as being 100 in cases where the light beam irradiated from the light projector to the grid pattern has moved across 100 light reflecting members or 100 light blocking members (i.e., m'th through m+99'th members). Actually, in some cases, the light beam may begin scanning immediately before it is irradiated to the m'th member, and the scanning may be finished immediately after the light beam has moved across the m+99'th member. In other cases, the light beam may begin scanning when it is irradiated to a position in the vicinity of an m-1'th member, and the scanning may be finished at a position in the vicinity of an m+100'th member. In both cases, the width, over which the light beam scans the material, is detected as being equal to 100p. However, in the former cases, the actual width, over which the light beam scans the material, is close to 99p. In the latter cases, the actual width, over which the light beam scans the material, is close to 101p.

In order to eliminate the problems described above, it is considered to set the initial position, at which the scanning begins, at a predetermined position. However, in cases where a piezo-electric device, or the like, is employed as the reciprocal movement mechanism, it is very difficult to set the initial position, at which the scanning begins, at a predetermined position.

SUMMARY OF THE INVENTION

The primary object of the present invention is to provide a scanning microscope, with which no distortion occurs in a formed image in cases where a scanning mechanism for moving an optical means with respect to a sample supporting member is employed.

Another object of the present invention is to provide a scanning width detecting device, wherein a width, over which a light beam scans a material, can be detected very accurately even if an initial position, at which the scanning begins, is not set at a predetermined position.

A further object of the present invention is to provide a magnification indicating apparatus for a scanning microscope, wherein a width, over which a light beam scans a sample, is detected very accurately, and a magnification, with which a microscope image is formed, is indicated accurately.

The present invention provides a scanning microscope provided with:

i) a sample supporting member on which a sample is supported, ii) an optical means which irradiates a light beam to said sample, iii) a movement mechanism which reciprocally moves said optical means with respect to said sample supporting member such that said light beam may scan said sample in main scanning directions and in sub-scanning directions, and iv) a photodetector for detecting light radiated out of the portion of said sample, which is exposed to said light beam, an image of said sample being thereby formed, wherein the improvement comprises the provision of:

a) a signal processing means for sampling a serial output of said photodetector and thereby generating image signal components of a digital image signal, which correspond to each main scanning line, b) a means for feeding pixel clock pulses into said signal processing means, the period of said pixel clock pulses being modulated so as to compensate for fluctuations in a speed, at which said optical means is moved reciprocally with respect to said sample supporting member, c) a means for generating a timing signal that determines the timing, with which the sampling process is begun, d) a grid pattern, which is secured to either one of said sample supporting member and said optical means and which is constituted of a plurality of light reflecting members or light blocking members standing side by side with one another in the direction, along which said optical means is moved reciprocally with respect to said sample supporting member, e) a light projector, which is associated with the other of said sample supporting member and said optical means and which irradiates a light beam to said grid pattern, f) a light receiver for detecting the light beam, which has been reflected by said grid pattern, or the light beam, which has passed through said grid pattern, g) a means for sampling a light beam detection signal, which has been generated by said light receiver, in accordance with said pixel clock pulses and thereby generating a digital displacement signal, and h) a means for approximating the relationship between the order x, where x = 1, 2, 3, ..., in which signal components of said digital displacement signal representing specific points appearing at equal pitches on said grid pattern occur, and the order y, in which said signal components of said digital displacement signal are sampled, with a quadratic equation $y = ax^2 + bx + c$, determining the direction, in which a phase of a drive signal fed into said movement mechanism is shifted with respect to a phase of said timing signal, in accordance with whether the coefficient a in said quadratic equation is positive or negative, and thereafter shifting the phase of said drive signal with respect to the phase of said timing signal.

The term "light radiated out of a sample" as used herein means light, which has passed through the sample, light which has been reflected from the sample, the fluorescence which is produced by the sample, or the like.

As will be understood from the specification, it should be noted that the term "moving an optical means with respect to a sample supporting member" as used herein means movement of the optical means relative to the sample supporting member, and embraces the cases wherein the optical means is moved while the sample supporting member is kept stationary, cases wherein the sample supporting member is moved while the optical means is kept stationary, and cases wherein both the optical means and the sample supporting member are moved.

FIGS. 5A through 5F are graphs showing an example of the relationship between the drive voltage for an electromagnet, or the like, and the displacement of a tuning fork in a light beam scanning mechanism composed of the tuning fork and the electromagnet. FIG. 5A is a graph showing a horizontal synchronizing signal fH, and FIG. 5B is a graph showing a pulsed signal Sf, which determines the drive frequency for the tuning fork. Also, FIG. 5C is a graph showing a drive voltage Vd for the electromagnet, and FIG. 5D is a graph showing a displacement F of the tuning fork. As shown in FIGS. 5C and 5D, the phase of the drive voltage Vd for the electromagnet and the phase of the displacement F of the tuning fork are deviated from each other by an amount of L1 due to a lag of the response of the tuning fork.

As illustrated in FIG. 5D, the displacement F of the tuning fork does not change linearly with respect to time t, but changes approximately in accordance with a sine function. Therefore, if the output S (shown in FIG. 5F) of the photodetector, which detects the light radiated out of the portion of the sample exposed to the light beam, is sampled at equal time intervals in accordance with pixel clock pulses having the same period, a digital image signal will be obtained which yields a distorted microscope image. This is because an ordinary image reproducing apparatus for reproducing an image from such a digital image signal is constituted to reproduce an image on the assumption that the image signal components of the digital image signal represent picture elements, which are equally spaced from one another.

Therefore, as illustrated in FIG. 5E, the period of pixel clock pulses CP should be modulated such that it may be inversely proportional to the speed, at which the light beam scans the sample, and which is expressed in terms of the absolute value of the value obtained from differentiation of the displacement F of the tuning fork. However, the phase of the pixel clock pulses CP shown in FIG. 5E has been determined by being synchronized with the horizontal synchronizing signal fH, and therefore the pixel clock pulses CP should be matched to the displacement F of the tuning fork such that the point k, at which the period of the pixel clock pulses CP is shortest, may coincide with the point j, at which the speed of the tuning fork is highest. For this purpose, as illustrated in FIG. 5C', the phase of the drive voltage Vd for the electromagnet, i.e., the phase of the pulsed signal Sf, may be shifted by an amount of L2. The appropriate value of the shift amount L2 varies in accordance with the drive frequency for the tuning fork, the duty ratio of the drive voltage Vd, which duty ratio is often altered in order to change the width over which the light beam scans the sample, and various disturbances.

However, with the scanning microscope in accordance with the present invention, the phase of the drive voltage Vd is always shifted by an appropriate value of the shift amount L2, and an image free of any distortion can be formed. How the phase of the drive voltage Vd is shifted appropriately in the scanning microscope in accordance with the present invention will be described hereinbelow.

FIG. 6A shows the horizontal synchronizing signal fH, and FIG. 6B shows a light beam detection signal Sg generated by the light receiver for detecting the light beam, which has been reflected by the grid pattern or which has passed through the grid pattern. The level of the light beam detection signal Sg changes periodically in accordance with the grid pattern. When the light beam detection signal Sg is sampled with a sampling period, which is determined by the pixel clock pulses CP, and the sampled signal is converted into a binary signal, a digital displacement signal D illustrated in FIG. 6D is obtained. FIG. 6C shows the order y, where $y=1, 2, 3, \ldots$, in which the light beam detection signal Sg is sampled. The digital displacement signal D represents specific points appearing at equal pitches on the grid pattern. The specific points may be, for example, forward ends of grids (the part of the light beam detection signal Sg corresponding to a forward end of a grid is indicated by A in FIG. 6B), rear ends of the grids (the part of the light beam detection signal Sg corresponding to a rear end of a grid is indicated by B in FIG. 6B), middle points of the grids (the part of the light beam detection signal Sg corresponding to a middle point of a grid is indicated by C in FIG. 6B), or middle points between adjacent grids (the part of the light beam detection signal Sg corresponding to a middle point between the adjacent grids is indicated by D in FIG. 6B).

As described above, if the displacement F of the tuning fork does not change linearly with respect to time t, the widths and pitches of high level parts of the light beam detection signal Sg will fluctuate within a single main scanning period. However, if the shift amount L2 is set at an appropriate value, the relationship expressed as or approximately expressed as $y=bx+c$ will obtain between the order x, where $x=1, 2, 3, \ldots$, in which signal components of the digital displacement signal D representing the specific points appearing at equal pitches on the grid pattern (e.g., the signal components representing the forward ends of the grids in the example shown in FIGS. 6A through 6D) occur, and the order y, in which these signal components of the digital displacement signal D are sampled. Specifically, in the example shown in FIGS. 6A through 6D, $y=5$ when $x=1$, $y=13$ when $x=2$, $y=21$ when $x=3$, and so on. Therefore, the relationship expressed as or approximately expressed as $y=8x-3$ obtains. In FIG. 7, this relationship is indicated by a straight line Q1.

However, if the shift amount L2 is set at an inappropriate value, the relationship between the order x and the order y obtains which is indicated by a zigzag line Q2 or a zigzag line Q3 in FIG. 7. Specifically, if the shift amount L2 is set at a value larger than the appropriate value, the relationship between the order x and the order y obtains which is indicated by the zigzag line Q2 in FIG. 7. If the shift amount L2 is set at a value smaller than the appropriate value, the relationship between the order x and the order y obtains which is indicated by the zigzag line Q3 in FIG. 7. The relationship between the order x and the order y, which is indicated by the zigzag line Q2 or the zigzag line Q3, can be approximately expressed as a quadratic equation $y=ax2+bx+c$. When the relationship between the order x and the order y obtains which is indicated by the zigzag line Q2, the coefficient a in the quadratic equation $y=ax2+bx+c$ takes a negative value. When the relationship between the order x and the order y obtains which is indicated by the zigzag line Q3, the coefficient a in the quadratic equation $y=ax2+bx+c$ takes a positive value. Therefore, a distortion of a reproduced microscope image can be eliminated by controlling the shift of the phase of the drive voltage Vd, i.e., the shift of the phase of the pulsed signal Sf, such that the shift amount L2 may be decreased when the coefficient a in the quadratic equation $y=ax2+bx+c$ takes a negative value, such that the shift amount L2 may be increased when the coefficient a in the quadratic equation $y=ax2+bx+c$ takes a positive value, and such that the shift amount L2 may be kept unchanged when the coefficient a in the quadratic equation $y=ax2+bx+c$ is zero.

The present invention also provides a scanning width detecting device for use in an apparatus provided with:
i) a material, which is to be scanned,
ii) a scanning means, and
iii) a movement mechanism which reciprocally moves said scanning means with respect to said material such that said scanning means may linearly scan said material, the scanning width detecting device comprising:
a) a grid pattern, which is combined with either one of said material and said scanning means and which is constituted of a plurality of light reflecting members or light blocking members standing side by side with one another at predetermined pitches in a direction, along which said scanning means is moved reciprocally with respect to said material,
b) a light projector, which is combined with the other of said material and said scanning means and which irradiates a light beam to said grid pattern,
c) a light receiver for detecting the light beam, which has been reflected by said grid pattern, or the light beam, which has passed through said grid pattern,
d) a means for sampling a light beam detection signal, which has been generated by said light receiver, in accordance with predetermined sampling clock pulses and thereby generating a digital displacement signal, and
e) a calculation means for approximating the relationship between the order x, where $x=1, 2, 3, \ldots$, in which signal components of said digital displacement signal representing specific points appearing at equal pitches on said grid pattern occur, and the order y, in which said signal components of said digital displacement signal are sampled, with a simple equation $y=ax+b$, multiplying the reciprocal of the coefficient a in said simple equation by a predetermined constant of proportionality, which is determined by time required for effective scanning and by the pitches of said light reflecting members or said light blocking members, and thereby finding a scanning width in the effective scanning.

As will be understood from the specification, it should be noted that the term "moving a scanning means with respect to a material" as used herein means movement of the scanning means relative to the material, and embraces the cases wherein the scanning means is moved while the material is kept stationary, cases wherein the material is moved while the scanning means is kept stationary, and cases wherein both the scanning means and the material are moved.

The present invention further provides a magnification indicating apparatus for a scanning microscope provided with:
i) a sample,
ii) a probe, and
iii) a movement mechanism which reciprocally moves said probe with respect to said sample such that said probe may linearly scan said sample, the magnification indicating apparatus for a scanning microscope comprising:

a) the aforesaid scanning width detecting device in accordance with the present invention,
b) a means for calculating a magnification of an image reproduction width in a microscope image reproducing means, which image reproduction width is taken in the direction of said scanning, with respect to the scanning width, which has been found by said scanning width detecting device, and
c) an indicating means for indicating the magnification, which has thus been calculated.

As will be understood from the specification, it should be noted that the term "moving a probe with respect to a sample" as used herein means movement of the probe relative to the sample, and embraces the cases wherein the probe is moved while the sample is kept stationary, cases wherein the sample is moved while the probe is kept stationary, and cases wherein both the probe and the sample are moved.

In the scanning width detecting device in accordance with the present invention, the coefficient a in the simple equation $y = ax + b$ represents the number of sampling operations per pitch of the light reflecting members or the light blocking members. Therefore, the reciprocal $1/a$ of the coefficient a represents how many pitches the scanning proceeds per sampling operation. The product $p \cdot 1/a$ of the reciprocal $1/a$ and the pitch p represents the scanning length per sampling operation (i.e., per a sampling period $\tau$). Ordinarily, the time T required for effective scanning is accurately determined by a horizontal synchronizing signal, or the like. Also, the time T required for effective scanning and the sampling period $\tau$ correspond to each other. Accordingly, the scanning width in the effective scanning can be found accurately by multiplying the value of $p \cdot 1/a$ by $T/\tau$, i.e., by multiplying the reciprocal $1/a$ by the constant of proportionality $p \cdot T/\tau$.

In general, in scanning microscopes, or the like, a serial electric signal representing a microscope image is sampled in accordance with predetermined sampling clock pulses, and a digital image signal is thereby obtained. In such cases, the sampling clock pulses can be utilized during the sampling for obtaining the aforesaid digital displacement signal. In cases where the sampling clock pulses are thus utilized during the sampling for obtaining the aforesaid digital displacement signal, if the number of sampling operations for the image signal, which are carried out within the effective scanning period, is equal to Ns, the number of sampling operations for the digital displacement signal is also equal to Ns. Therefore, $T/\tau = Ns$. Accordingly, in such cases, the value of $p \cdot Ns$ may be employed as the constant of proportionality.

With the magnification indicating apparatus for a scanning microscope in accordance with the present invention, a calculation is made to find the magnification of the image reproduction width in the microscope image reproducing means, which image reproduction width is taken in the direction of the scanning, with respect to the scanning width, which has been found accurately in the manner described above. Therefore, the magnification can be found and indicated accurately.

DESCRIPTION OF THE PREFERRED EMBODIMENTS

The present invention will hereinbelow be described in further detail with reference to the accompanying drawings.

Figure 2:
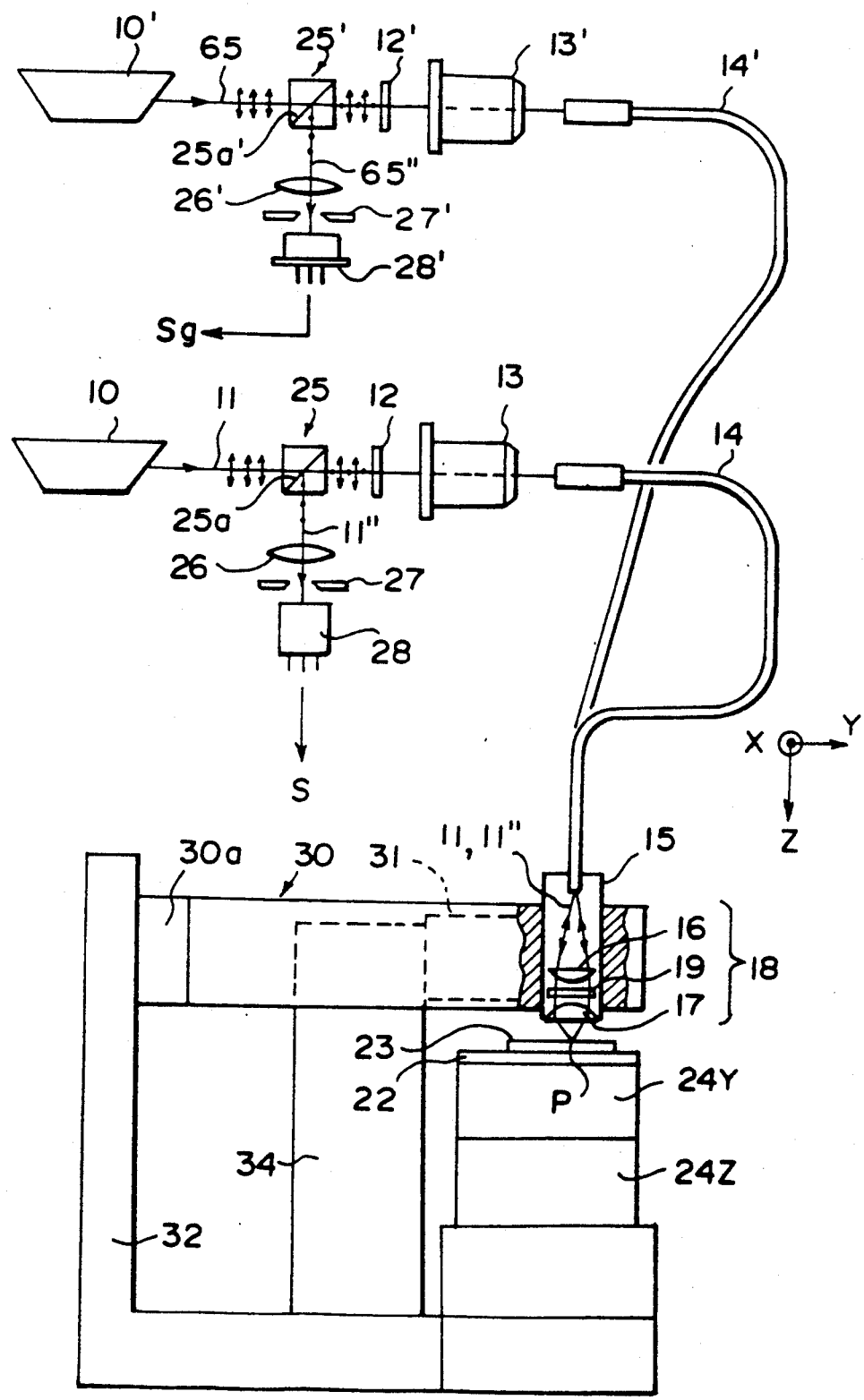
FIG. 2 is a partially cutaway front view showing the embodiment of the scanning microscope in accordance with the present invention.
Figure 3:
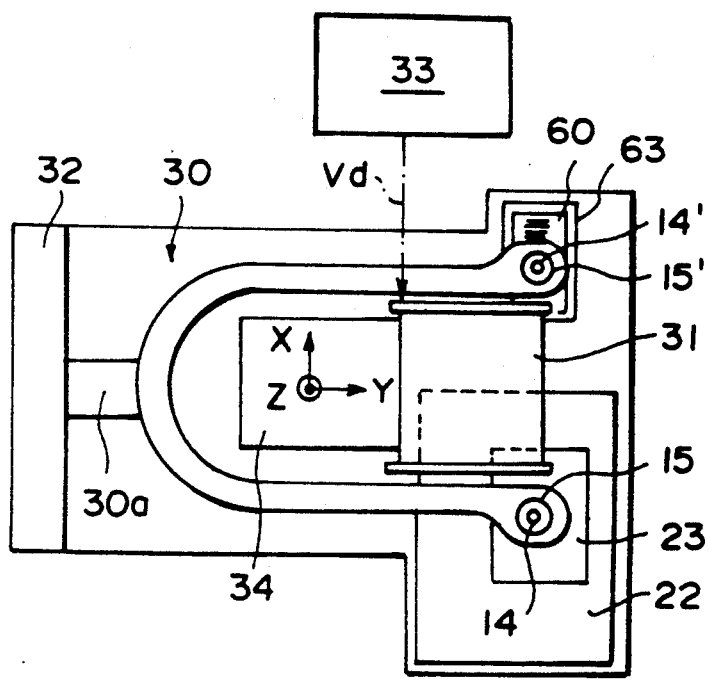
FIG. 3 is a plan view showing a light beam scanning mechanism, which is employed in the embodiment of the scanning microscope in accordance with the present invention.

FIG. 2 shows an embodiment of the scanning microscope in accordance with the present invention, which is a monochromatic reflection type of confocal scanning microscope. FIG. 3 is a plan view showing the scanning mechanism employed in this embodiment. As shown in FIG. 2, a monochromatic light laser 10 produces a laser beam 11 having a single wavelength. The linear polarized laser beam 11 impinges in the P-polarized condition upon a film surface 25a of a polarization beam splitter 25 and passes therethrough. The laser beam 11, which has passed through the polarization beam splitter 25, then passes through a halfwave plate 12 for adjusting the plane of polarization. The laser beam 11, which has passed through the halfwave plate 12, is condensed by an entry lens 13 and enters a polarization plane keeping optical fiber 14.

Figure 4:
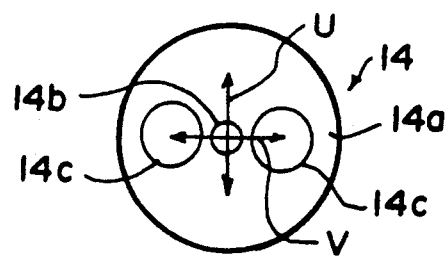
FIG. 4 is a sectional view showing a polarization plane keeping optical fiber, which is employed in the embodiment of the scanning microscope in accordance with the present invention.

As the polarization plane keeping optical fiber 14, a PANDA type optical fiber may be employed. FIG. 4 shows the cross-sectional configuration of the PANDA type optical fiber 14. As illustrated in FIG. 4, the optical fiber 14 is composed of a cladding part 14a and a core 14b which is located in the cladding part 14a. Stress imparting parts 14c, 14c are formed on both sides of the core 14b. The halfwave plate 12 is rotated appropriately such that the orientation of the plane of polarization of the linear polarized laser beam 11 coincides with the directions indicated by the double headed arrow V in FIG. 4, along which the stress imparting parts 14c, 14c stand in a line, or the directions indicated by the double headed arrow U in FIG. 4, which directions are normal to the directions indicated by the double headed arrow V. (In this embodiment, the halfwave plate 12 is rotated appropriately such that the orientation of the plane of polarization of the linear polarized laser beam 11 coincides with the directions indicated by the double headed arrow U in FIG. 4. In this manner, the linear polarized laser beam 11 is caused to impinge upon the optical fiber 14.

One end of the optical fiber 14 is secured to a probe 15. The laser beam 11, which has been guided through the optical fiber 14, is radiated out of said end of the optical fiber 14. At this time, said end of the optical fiber 14 radiates the laser beam 11 like a point light source. A light projecting optical means 18, which is composed of a collimator lens 16 and an objective lens 17, is secured to the probe 15. (The light projecting optical means 18 also serves as a light receiving optical means.) A quarter-wave plate 19 is located between the collimator lens 16 and the objective lens 17.

The laser beam 11, which has been radiated out of the aforesaid end of the optical fiber 14, is collimated by the collimator lens 16. The collimated laser beam 11 then passes through the quarter-wave plate 19 and is converted thereby into a circularly polarized laser beam. The collimated laser beam 11 is then condensed by the objective lens 17, and an image of a small light spot P of the condensed laser beam 11 is formed on a sample 23 (i.e. on the surface of the sample 23 or in the inside of the sample 23). The sample 23 is placed on a sample supporting member 22. The laser beam 11 is reflected by the sample 23. At this time, the direction of rotation of the circularly polarized laser beam 11 is reversed. The laser beam 11", which has thus been reflected by the sample 23, passes through the quarter-wave plate 19 and is converted thereby into a linear polarized laser beam 11" having the plane of polarization, which is oriented in the direction normal to the orientation of the plane of polarization of the laser beam 11. Thereafter, the laser beam 11" is condensed by the collimator lens 16 and impinges upon the polarization plane keeping optical fiber 14. At this time, the orientation of the plane of polarization of the laser beam 11" coincides with the directions indicated by the double headed arrow V in FIG. 4. The laser beam 11", which has been guided through the optical fiber 14, is radiated out of the end of the optical fiber 14 and collimated by the entry lens 13.

Figure 5:
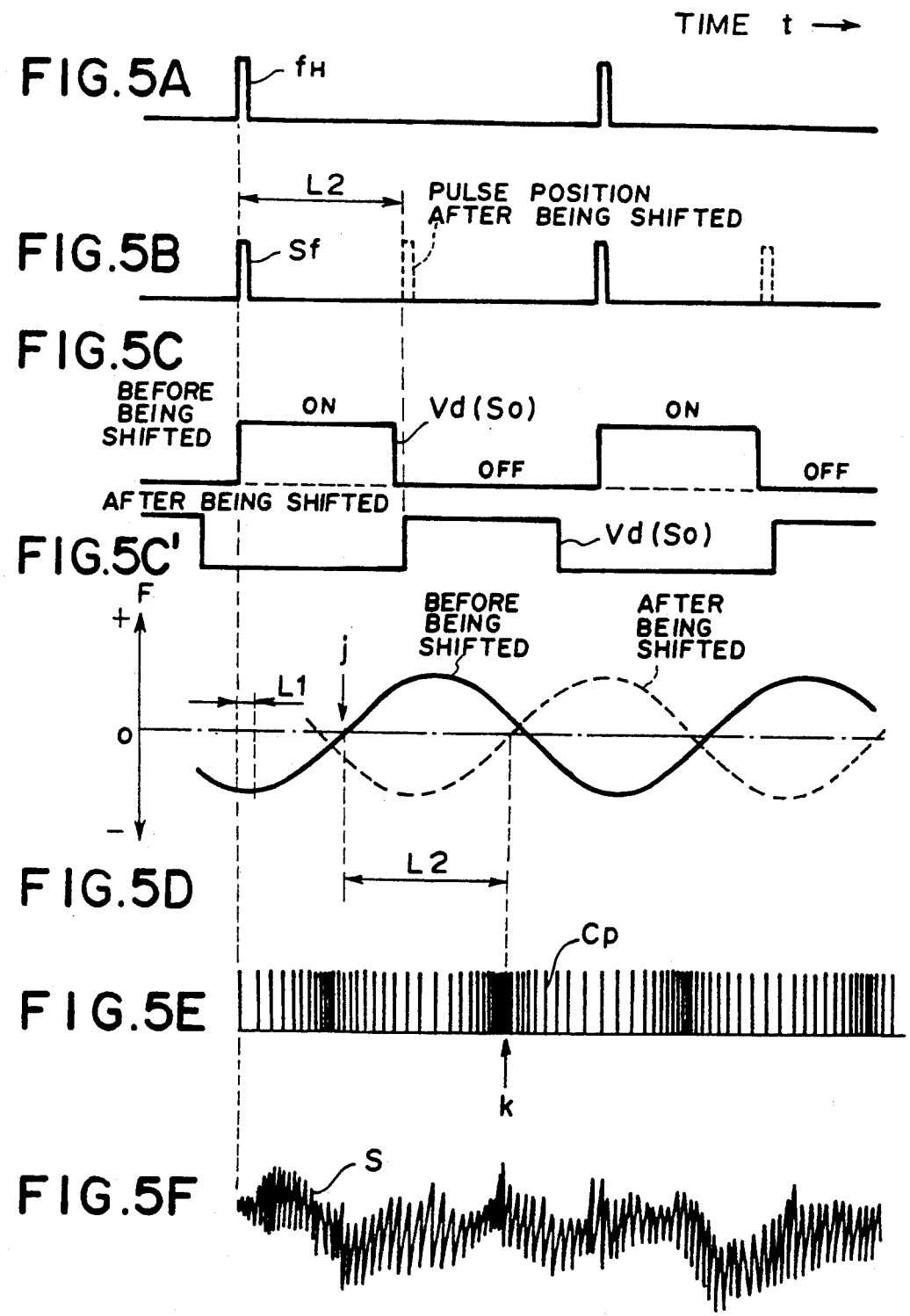
FIGS. 5A through 5F are graphs showing the relationship between wave forms of various signals and the displacement of a tuning fork in the embodiment of the scanning microscope in accordance with the present invention.

Thereafter, the laser beam 11", which has thus been collimated by the entry lens 13, passes through the halfwave plate 12, impinges upon the film surface 25a of the polarization beam splitter 25 in the S-polarized condition, and is reflected by the film surface 25a. The laser beam 11", which has thus been reflected by the film surface 25a, is condensed by a condensing lens 26, passes through an aperture pinhole 27, and is detected by a photodetector 28. The photodetector 28 is constituted of a photomultiplier, or the like, and generates a serial signal S representing the brightness of the region of the sample 23 which was exposed to the laser beam. (The serial signal S is shown in FIG. 5F.)

As described above, a light isolator is provided which is composed of the quarter-wave plate 19 and the polarization beam splitter 25. Therefore, the laser beam 11" does not return to the laser 10, and a large amount of the laser beam 11" can be guided to the photodetector 28. Also, the laser beam 11, which is reflected by the entry lens 13, the end surface of the optical fiber 14, or the like, is prevented from impinging upon the photodetector 28. Therefore, a signal S having a high S/N ratio can be obtained.

How the sample 23 is two-dimensionally scanned with the light spot P of the laser beam 11 will be described hereinbelow with reference to FIG. 3. The probe 15 is secured to one end of a tuning fork 30, which is placed horizontally, such that the optical axis of the optical means 18 extends vertically. A base part 30a of the tuning fork 30 is secured to a frame 32, and the tuning fork 30 can vibrate at a predetermined intrinsic frequency. An electromagnet 31 is located inside of the space defined by the tuning fork 30 in a slightly spaced relation to both ends of the tuning fork 30. The electromagnet 31 is secured to a support 34, which is in turn secured to the frame 32.

A driving circuit 33 applies a square-pulsed voltage Vd having a frequency, which is equal to the intrinsic frequency of the tuning fork 30, to the electromagnet 31. In this manner, a magnetic field is intermittently applied to both ends of the tuning fork 30. Therefore, the tuning fork 30 vibrates at its intrinsic frequency. As a result, the probe 15 secured to the tuning fork 30 is reciprocally moved at high speeds in the directions indicated by the arrow X in FIGS. 2 and 3 (i.e., horizontally). In this manner, the sample 23 is scanned with the light spot P in the main scanning directions.

A Z movable stage 24Z, which is capable of reciprocally moving in the directions indicated by the arrow Z (i.e. along the optical axis of the optical means 18), is located on the frame 32. Also, a Y movable stage 24Y, which is capable of reciprocally moving in the directions indicated by the arrow Y (which directions are normal to the directions indicated by the arrows X and Z), is located on the Z movable stage 24Z. The sample supporting member 22 is mounted on the Y movable stage 24Y. When the main scanning with the light spot P is carried out in the manner described above, the Y movable stage 24Y is moved reciprocally. In this manner, the sub-scanning with the light spot P can be effected.

Each time the two-dimensional scanning with the light spot P is carried out, the Z movable stage 24Z is moved appropriately. In this manner, even if small protrusions or recesses are present on the surface of the sample 23, a signal S can be obtained which represent the image information at every focusing plane within the range of movement of the sample 23 along the directions indicated by the arrow Z.

As illustrated in FIG. 3, in this embodiment, a dummy probe 15' having the same configuration as the probe 15 is secured to the other end of the tuning fork 30. In this manner, the mechanical balance between both ends of the tuning fork 30 can be kept good, and an approximately ideal resonant system can be obtained.

Figure 8:
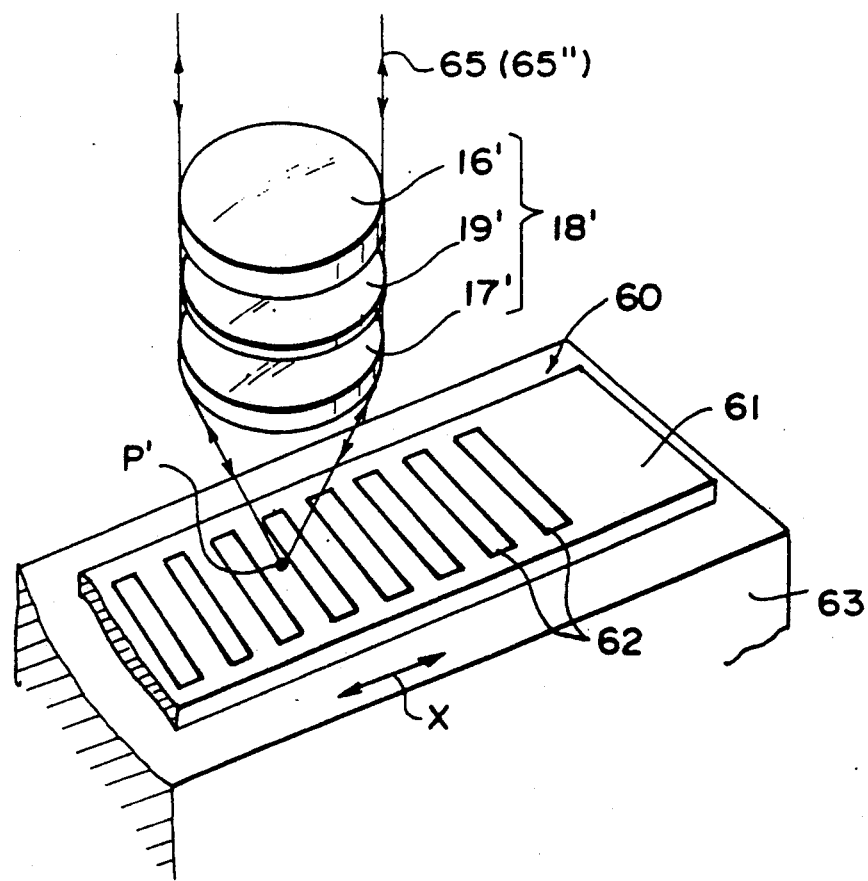
FIG. 8 is a partially cutaway perspective view showing the major part of the embodiment of the scanning microscope in accordance with the present invention.

The dummy probe 15' also serves to generate a signal representing the displacement of the tuning fork 30. Specifically, as illustrated in FIG. 8, a light projecting optical means 18', which is composed of a collimator lens 16', an objective lens 17', and a quarter-wave plate 19' as in the light projecting optical means 18 of the probe 15, is secured to the dummy probe 15'. Also, as illustrated in FIG. 2, the light projecting optical means 18' is optically coupled with a polarization plane keeping optical fiber 14', an entry lens 13', a halfwave plate 12', a monochromatic light laser 10', a polarization beam splitter 25' having a film surface 25a', a condensing lens 26', an aperture pinhole 27', and a photodetector 28'. The photodetector 28' is constituted of a photodiode, or the like. These elements 10', 12', 13', 14', 25', 25a', 26', and 27' are respectively of the same types as those of the elements 10, 12, 13, 14, 25, 25a, 26, and 27.

As illustrated in FIGS. 3 and 8, a grid pattern 60 is located below and close to the end of the tuning fork 30, which end supports the dummy probe 15'. The grid pattern 60 comprises a substrate 61, which is constituted of a material having a comparatively high light absorptivity, and a plurality of linear light reflecting members 62, 62, ..., which have a predetermined width and which are located on the substrate 61. The light reflecting members 62, 62, ... stand side by side with one another at predetermined intervals. The grid pattern 60 is secured to a support member 63, which is in turn secured to the frame 32. The light reflecting members 62, 62, ... are constituted of layers of a metal, such as aluminum, or a compound, and reflect the incident light beam at a high reflectivity. The light reflecting members 62, 62, ... stand side by side with one another in the directions indicated by the arrow X, i.e., in the direction along which the end of the tuning fork 30 vibrates.

In this embodiment, the electromagnet 31 is located inside of the space defined by the tuning fork 30 in order to apply a magnetic field to both ends of the tuning fork 30. Therefore, the magnetic flux density applied to the tuning fork 30, i.e. the force applied thereto, can be kept larger than when an electromagnet is located on the side outward from one edge part of the tuning fork 30.

Figure 1:
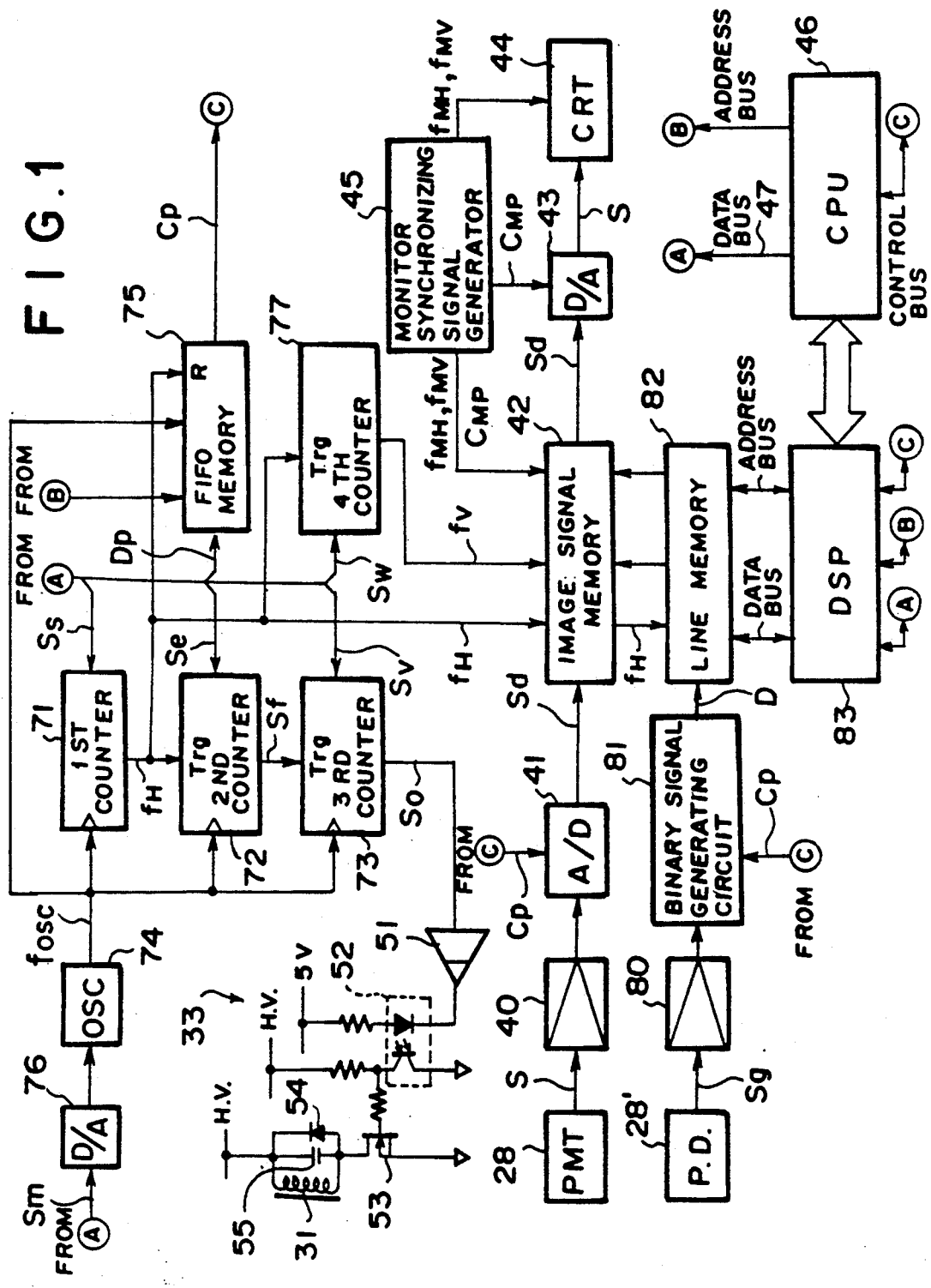
FIG. 1 is a diagram showing an electric circuit of an embodiment of the scanning microscope in accordance with the present invention.

An electric configuration for the aforesaid embodiment will be described hereinbelow with reference to FIG. 1. The serial analog signal S, which has been generated by the photodetector 28, is amplified by an amplifier 40. The amplified signal S is then fed into an A/D converter 41. In the A/D converter 41, the amplified signal S is sampled and quantized, and a digital image signal Sd is thereby obtained. The period and the timing, with which the amplified signal S is sampled, are determined in accordance with pixel clock pulses CP. The image signal Sd is stored in an image signal memory 42. The image signal Sd is thereafter read from the image signal memory 42 and converted by a D/A converter 43 into an analog image signal S. The analog image signal S is then fed into a raster scanning type of image reproducing apparatus 44, which may be constituted of a CRT display device, or the like. The image reproducing apparatus 44 reproduces an image, which is represented by the image signal S, i.e., a microscope image of the sample 23.

The operation for storing the image signal Sd in the image signal memory 42 is controlled in accordance with a horizontal synchronizing signal fH and a vertical synchronizing signal fV, which are generated in the manner described later. By way of example, a dual port memory is employed as the image signal memory 42. The operation for reading the image signal Sd from the image signal memory 42 is controlled independently of the operation for storing the image signal Sd. Specifically, the operation for reading the image signal Sd from the image signal memory 42 is controlled in accordance with a monitor system horizontal synchronizing signal fMH, a monitor system vertical synchronizing signal fMV, and a monitor system pixel clock pulses CMP. The monitor system horizontal synchronizing signal fMH, the monitor system vertical synchronizing signal fMV, and the monitor system pixel clock pulses CMP are generated by a monitor system synchronizing signal generator 45. The raster scanning in the image reproducing apparatus 44 is also controlled in accordance with the monitor system horizontal synchronizing signal fMH and the monitor system vertical synchronizing signal fMV. Also, the D/A conversion of the image signal Sd in the D/A converter 43 is controlled in accordance with the monitor system pixel clock pulses CMP.

An ordinary raster scanning type of image reproducing apparatus is employed as the image reproducing apparatus 44. Therefore, it is necessary that each group of image signal components of the image signal Sd, which components correspond to a single main scanning line, represent information at equally spaced points on the sample 23. If each group of the image signal components of the image signal Sd, which correspond to a single main scanning line, do not represent information at equally spaced points on the sample 23, the microscope image reproduced by the image reproducing apparatus 44 from the image signal Sd will become distorted. How the aforesaid requirement is satisfied in this embodiment will be described hereinbelow.

A central processing unit (hereinbelow referred to as "CPU") 46 of the computer system feeds a frequency designating signal Ss through a data bus 47 into a first counter 71. The first counter 71 also receives a pulsed signal fosc, which has a predetermined frequency, from a pulse generator 74. The first counter 71 counts the same number of pulses of the pulsed signal fosc as that indicated by the frequency designating signal Ss and thereby generate the horizontal synchronizing signal fH. (The horizontal synchronizing signal fH is shown in FIG. 5A.) Also, a pixel clock signal Dp is fed from the CPU 46 into a first-in first-out memory (hereinafter referred to as "FIFO memory") 75. The pixel clock signal Dp is temporarily stored in the FIFO memory 75. Thereafter, the pixel clock signal Dp is fed out of the FIFO memory 75 in the order, in which it was fed into the FIFO memory 75, while the output address is reset to zero by the horizontal synchronizing signal fH received from the first counter 71. As illustrated in FIG. 5D, the displacement F of the tuning fork 30, which is caused to vibrate in the manner described above, changes approximately in accordance with a sine function wherein time t serves as a variable. In order to cope with such a change in the displacement F of the tuning fork 30, the pixel clock signal Dp carries pixel clock pulses, which have been modulated such that their intervals may change with a period equal to ½ of the period of the sine function. (As will be described later, the period becomes equal to the period of the horizontal synchronizing signal fH.) Modulation of the pixel clock pulses is carried out such that their intervals are inversely proportional to the absolute values of values obtained from differentiation of the sine function. However, the pixel clock pulses are not correlated to the difference in phase with respect to the displacement F of the tuning fork 30. As illustrated in FIGS. 5A and 5E, the phase of the pixel clock pulses is matched to the phase of the horizontal synchronizing signal fH through the control of the output of the FIFO memory 75.

A D/A converter 76 is connected to the pulse generator 74. The D/A converter 76 receives an operating frequency correcting signal Sm from the CPU 46. The frequency of the pulsed signal fosc, which is generated by the pulse generator 74, is minutely corrected in accordance with the operating frequency correcting signal Sm. The horizontal synchronizing signal fH is also fed into a fourth counter 77. The fourth counter 77 also receives a vertical line number setting signal Sw from the CPU 46. The fourth counter 77 counts the horizontal synchronizing signal fH in a number equal to the number represented by the vertical line number setting signal Sw and thereby generates the vertical synchronizing signal fV.

The horizontal synchronizing signal fH, which has been generated by the first counter 71, is also fed into a second counter 72. The second counter 72 generates a pulsed signal Sf whose period is equal to the period of the horizontal synchronizing signal fH. The pulsed signal Sf is shown in FIG. 5B. In the example shown in FIGS. 5A and 5B, the phase of the pulsed signal Sf is matched to the phase of the horizontal synchronizing signal fH. However, actually, the second counter 72 feeds out the pulsed signal Sf such that it may delays with respect to the phase of the horizontal synchronizing signal fH by a time span L2, which is represented by a delay setting signal Se received from the CPU 46. The delay time L2 is set by counting the same number of the pulses of the pulsed signal fosc as the number indicated by the delay setting signal Se.

The pulsed signal Sf is fed into a third counter 73. The third counter 73 generates a square-wave tuning fork operating signal So whose phase is matched to the phase of the pulsed signal Sf. The tuning fork operating signal So is shown in FIG. 5C. The width of the high level part of the tuning fork operating signal So is set at a value corresponding to a duty setting signal Sv, which is received from the CPU 46, by counting the same number of the pulses of the pulsed signal fosc as the number indicated by the duty setting signal Sv. In the manner described later, the drive voltage Vd shown in FIG. 5C, which has the same wave form as that of the tuning fork operating signal So, is applied to the electromagnet 31. Therefore, the tuning fork operating signal So serves to determine the drive duty ratio of the electromagnet 31. The amplitude of the tuning fork 30 becomes larger as the duty ratio of the electromagnet 31 is higher. Therefore, the duty setting signal Sv is changed when the width, with which the laser beam 11 scans the sample 23 in the main scanning directions, is to be altered.

How the drive voltage Vd is generated in accordance with the tuning fork operating signal So will be described hereinbelow. The tuning fork operating signal So is fed into an electromagnet drive circuit 33. The electromagnet drive circuit 33 comprises an open-collector buffer 51, a photocoupler 52, a power MOS-FET 53, a diode 54, and a capacitor 55. The electromagnet drive circuit 33 applies the square-pulsed voltage Vd, which has the same wave form as that of the tuning fork operating signal So, to the electromagnet 31.

In the manner described above, the electromagnet 31 is operated in accordance with the drive voltage Vd, and the tuning fork 30 is thereby caused to vibrate. As described above, the displacement F of the tuning fork 30 changes in the pattern shown in FIG. 5D. At this time, due to the delay of responses of the electromagnet 31 and the tuning fork 30, the displacement F of the tuning fork 30 delays by the amount, which is indicated by L1 in FIG. 5D, with respect to the drive voltage Vd. With respect to the displacement F of the tuning fork 30, the phase of the pixel clock pulses CP should be determined such that a point k, at which the period of the pixel clock pulses CP is shortest, may coincide with a point j, at which the speed of the tuning fork 30 is highest. However, as described above, the phase of the pixel clock pulses CP is matched to the phase of the horizontal synchronizing signal fH. Therefore, the displacement F of the tuning fork is delayed by the amount, which is indicated by L2 in FIG. 5D. For this purpose, the phase of the drive voltage Vd, i.e., the phase of the pulsed signal Sf, may be shifted (delayed) by the amount of L2 from the phase of the horizontal synchronizing signal fH. As described above, the delay amount L2 of the pulsed signal Sf is set by the second counter 72. The phase of the drive voltage Vd, which has been shifted, is shown in FIG. 5C'.

How the delay amount L2 is set will be described hereinbelow. Originally, the delay amount L2 is set by the CPU 46 at a predetermined value. If the predetermined delay amount is not appropriate, it is corrected in the manner described below.

When a microscope image is formed, the laser 10' and the photodetector 28' are also activated. A laser beam 65 is produced by the laser 10'. The laser beam 65 propagates through the polarization plane keeping optical fiber 14' and is converged by the optical means 18' of the dummy probe 15' into a small light spot P' on the grid pattern 60. As the tuning fork 30 vibrates, the the same directions as the main scanning directions indicated by the arrow X. Therefore, the light spot P' impinges alternately upon the plurality of the light reflecting members 62, 62, . . . and the low-reflectivity parts of the substrate 61.

Figure 6:
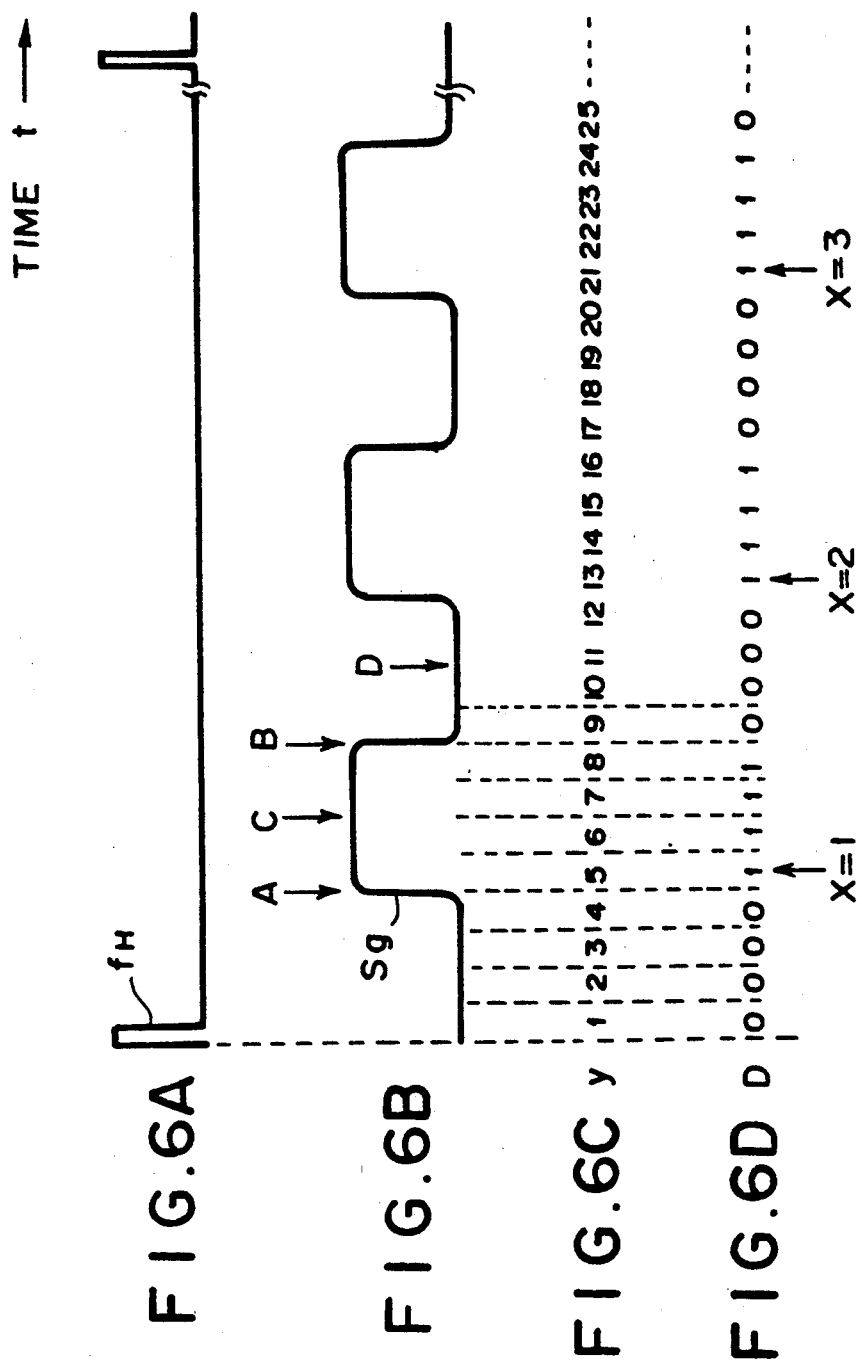
FIGS. 6A, 6B, 6C, and 6D are explanatory views showing a digital displacement signal, the order in which signal components of the digital displacement signal are sampled, and the order in which specific signal components of the digital displacement signal occur.
Figure 7:
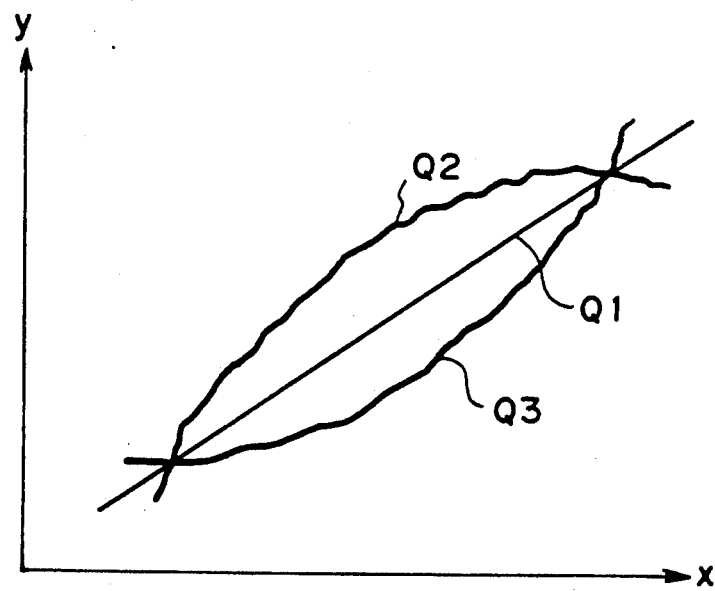
FIG. 7 is an explanatory graph showing how the direction of shift of a tuning fork drive signal is determined.

In the same manner as when the laser beam 11'', which has been reflected by the sample 23, is detected by the photodetector 28, the laser beam 65'', which has been reflected by the light reflecting members 62, 62, . . . , is detected by the photodetector 28'. At the time at which the light spot P' impinges upon a low-reflectivity part of the substrate 61, the amount of the reflected laser beam 65'' becomes markedly small. Therefore, as shown in FIG. 6B, the signal Sg, which is generated by the photodetector 28', fluctuates periodically in accordance with the movement of the tuning fork 30. The signal Sg is amplified by an amplifier 80 and is then fed into a binary signal generating circuit 81. The binary signal generating circuit 81 samples the signal Sg each time it receives one of the pixel clock pulses CP. The binary signal generating circuit 81 then compares the level of the sampled signal Sg with a predetermined threshold value and thereby generates the binary digital displacement signal D. FIG. 6D shows an example of the signal components of the digital displacement signal D, which are arrayed in the order y, in which the signal Sg is sampled. The order y is shown in FIG. 6C. The digital displacement signal D is temporarily stored in a line memory 82 in units of the signal components of the digital displacement signal D obtained during a single main scanning period.

A digital signal processor (hereinafter referred to as "DSP") 83 is connected to the CPU 46. The DSP 83 reads the digital displacement signal D from the line memory 82 and makes a judgment from the digital displacement signal D as to whether the delay amount L2 is or is not appropriate. For this purpose, the DSP 83 finds signal components, which represents specific points appearing at equal pitches on the grid pattern 60, from the digital displacement signal D. As shown in FIG. 6B, the signal components, which are thus found from the digital displacement signal D, may be those corresponding to points A in the signal Sg, points B in the signal Sg, points C in the signal Sg, points D in the signal Sg, or the like. The DSP 83 finds the relationship between the order x, where x = 1, 2, 3, ... as shown in FIG. 6D, in which these signal components of the digital displacement signal D are found, and the order y, where y = 1, 2, 3, ..., in which these signal components of the digital displacement signal D are sampled. The DSP 83 approximates the relationship with a quadratic equation $y = ax^2 + bx + c$ by utilizing, for example, the least squares method. Also, the DSP 83 feeds a signal, which represents the value of the coefficient a in the quadratic equation $y = ax^2 + bx + c$, into the CPU 46. The CPU 46 corrects the delay setting signal Se such that the delay amount L2 may be decreased by a predetermined small amount when the coefficient a takes a negative value, and the delay amount L2 may be increased by a predetermined small amount when the coefficient a takes a positive value. When the coefficient a takes a value of zero, the CPU 46 does not change the delay setting signal Se. By such correction of the delay amount L2, the delay amount L2 of the pulsed signal Sf, i.e., of drive voltage Vd, with respect to the horizontal synchronizing signal fH is adjusted appropriately. As a result, the point j, at which the speed of the displacement F of the tuning fork 30 shown in FIG. 5D is highest, coincides with the point k, at which the period of the pixel clock pulses CP shown in FIG. 5E is shortest. Accordingly, no distortion occurs in the microscope image reproduced by the image reproducing apparatus 44.

The rising parts and the falling parts in the pulsed signal Sg shown in FIG. 6B directly reflect a change in the amount of the reflected laser beam 65" due to chipped edges of the light reflecting members 62, 62, ..., or the like. For the purpose of preventing the accuracy, with which the specific points appearing at equal pitches on the grid pattern 60 are detected, from becoming low due to such a change in the amount of the reflected laser beam 65", the signal components of the digital displacement signal D, which correspond to points C or D shown in FIG. 6B, should preferably be found as the signal components of the digital displacement signal D representing the specific points appearing at equal pitches on the grid pattern 60.

Also, in the aforesaid embodiment, the phase of the pixel clock pulses CP is fixed with respect to the phase of the horizontal synchronizing signal fH, and the phase of the drive voltage Vd is shifted. Alternatively, the phase of the drive voltage Vd may be fixed, and the phase of the pixel clock pulses CP may be shifted.

Additionally, instead of using the grid pattern 60 composed of a plurality of the light reflecting members 62, 62, ..., a grid pattern, which is composed of a light permeable substrate and a plurality of light blocking members located side by side with one another on the substrate, may be utilized, and a light beam which has passed through the g id pattern may be detected by the light receiver.

In the embodiment described above, the tuning fork 30 is caused to vibrate by the electromagnet 31. The scanning microscope in accordance with the present invention is also applicable when the tuning fork 30 is caused to vibrate by any of other exciting means, e.g., a piezo-electric device secured to the tuning fork 30. In such cases, the effects of preventing any distortion from occurring in a microscope image as described above can be achieved.

The aforesaid embodiment of the scanning microscope in accordance with the present invention is of the monochromatic reflection type. The scanning microscope in accordance with the present invention is also applicable to scanning microscopes for forming color images, transmission types of scanning microscopes, scanning fluorescence microscopes, or the like.

Figure 9:
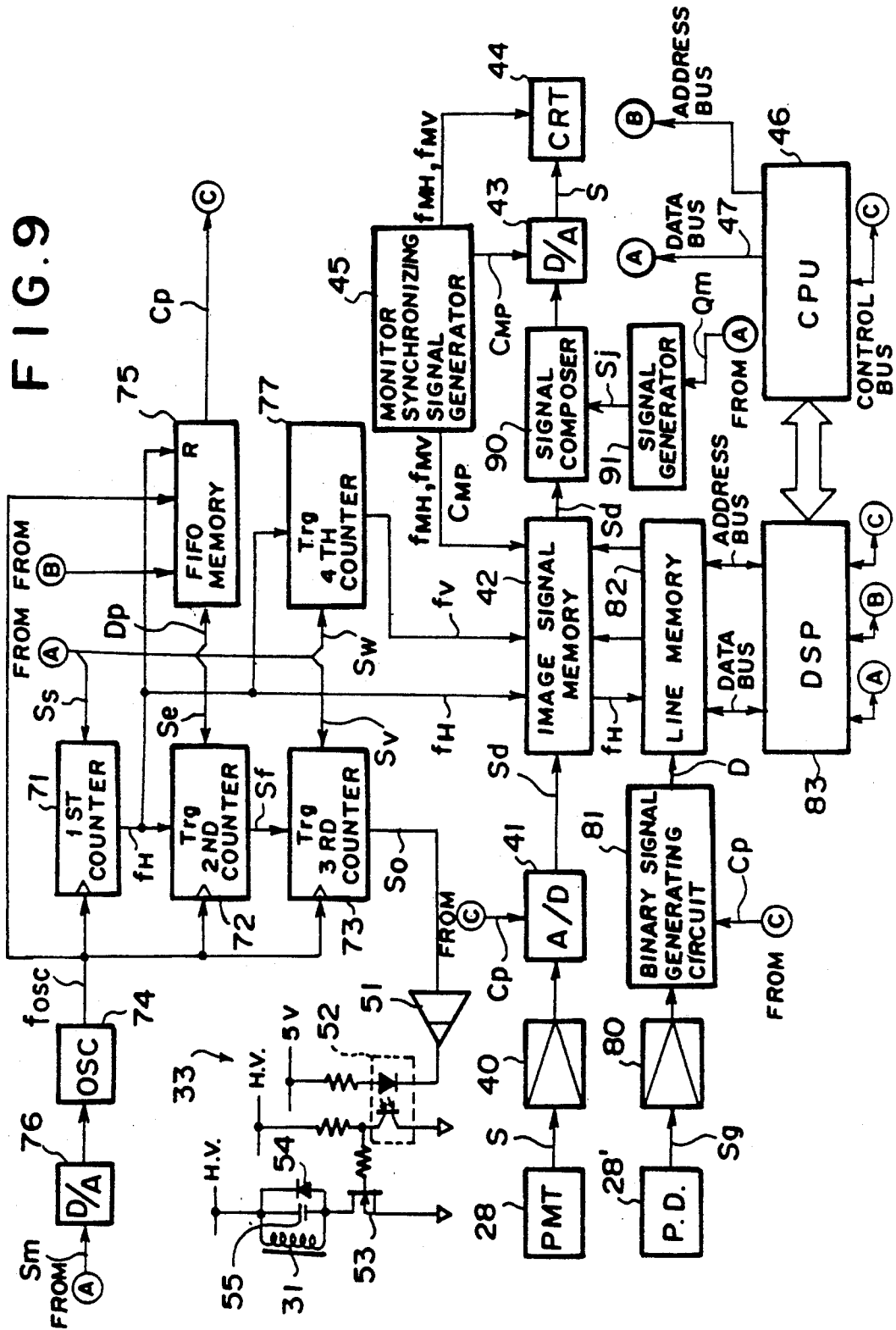
FIG. 9 is a diagram showing an electric circuit of a scanning microscope, in which an embodiment of the magnification indicating apparatus in accordance with the present invention is employed.

Embodiments of the scanning width detecting device in accordance with the present invention and the magnification indicating apparatus for a scanning microscope in accordance with the present invention will be described hereinbelow with reference to FIG. 9. By way of example, an embodiment of the magnification indicating apparatus for a scanning microscope in accordance with the present invention is incorporated in the confocal scanning microscope shown in FIG. 2. In FIG. 9, similar elements are numbered with the same reference numerals with respect to FIG. 1.

As illustrated in FIG. 9, in this embodiment, after the image signal Sd is stored in the image signal memory 42, it is read from the image signal memory 42 and fed into a signal composer 90. The image signal Sd is then fed into the D/A converter 43 and converted thereby into the analog image signal S.

In this embodiment of the magnification indicating apparatus for a scanning microscope in accordance with the present invention, detection of the effective scanning width in the main scanning directions indicated by the arrow X and indication of the microscope magnification are carried out in the manner described below.

The DSP 83, which is connected to the CPU 46, reads the digital displacement signal D from the line memory 82 and finds signal components, which represents specific points appearing at equal pitches on the grid pattern 60, from the digital displacement signal D. As shown in FIG. 6B, the signal components, which are thus found from the digital displacement signal D, may be those corresponding to points A in the signal Sg, points B in the signal Sg, points C in the signal Sg, points D in the signal Sg, or the like. The DSP 83 finds the 20 relationship between the order x, where x = 1, 2, 3, ... as shown in FIG. 6D, in which these signal components of the digital displacement signal D are found, and the order y, where y = 1, 2, 3, ..., in which these signal components of the digital displacement signal D are sampled. The DSP 83 approximates the relationship with a simple equation $y = ax + b$ by utilizing, for example, the least squares method. Also, the DSP 83 feeds a signal, which represents the value of the coefficient a in the simple equation $y = ax + b$, into the CPU 46.

The CPU 46 multiplies the reciprocal 1/a of the coefficient a by the constant of proportionality p.Ns and thereby finds the effective scanning width Lx in the directions indicated by the arrow X. In the formula pNs, p represents the pitches at which the light reflecting members 62, 62, ... are located side by side with one another, and Ns represents the number of sampling operations for the signal Sg during the generation of the digital displacement signal D. In this embodiment, the number of sampling operations for the signal Sg during the effective scanning period in the directions indicated by the arrow X is equal to the number of sampling operations for the signal S in the A/D converter 41. In such cases, as described above in detail, the effective scanning width Lx can be calculated by multiplying the reciprocal 1/a by the constant of proportionality p.Ns.

Thereafter, the CPU 46 calculates the magnification M=Lx'/Lx of the image reproduction width Lx' in the image reproducing apparatus 44, which width is taken in the directions indicated by the arrow X, with respect to the effective scanning width Lx. The CPU 46 then feeds a signal Qm, which represents the magnification M, into an image signal generator 91. The image signal generator 91 feeds out a digital image signal Sj, which represents numerals and characters indicating the magnification M. The digital image signal Sj is fed into the signal composer 90. The signal composer 90 combines the image signal Sj with the image signal Sd, which has been read from the image signal memory 42. The signal composition is carried out such that the magnification M may be indicated with, for example, inverse characters at peripheral regions of the microscope image represented by the image signal Sd. The image signal Sd, which has been combined with the image signal Sj, is fed into the image reproducing apparatus 44, and the magnification M is thereby indicated on the reproduced image. For the reasons described above, the effective scanning width Lx can be detected accurately even if the initial scanning position is not set. Therefore, the magnification M can also be found and indicated accurately.

Although the aforesaid embodiment of the scanning width detecting device is applied to a scanning microscope in which the tuning fork 30 is caused to vibrate by the electromagnet 31, the scanning width detecting device in accordance with the present invention is also applicable when a scanning width is detected in apparatuses other than a microscope. Also, the magnification indicating apparatus for a scanning microscope in accordance with the present invention is applicable not only to the optical type of scanning microscope but also to other types of scanning microscopes.

What is claimed is:

1. A scanning microscope provided with:
   i) a sample supporting member on which a sample is supported,
   ii) an optical means which irradiates a light beam to said sample,
   iii) a movement mechanism which reciprocally moves said optical means with respect to said sample supporting member such that said light beam may scan said sample in main scanning directions and in sub-scanning directions, and
   iv) a photodetector for detecting light radiated out of the portion of said sample, which is exposed to said light beam, an image of said sample being thereby formed,
   wherein the improvement comprises the provision of:
   a) a signal processing means for sampling a serial output of said photodetector and thereby generating image signal components of a digital image signal, which correspond to each main scanning line,
   b) a means for feeding pixel clock pulses into said signal processing means, the period of said pixel clock pulses being modulated so as to compensate for fluctuations in a speed, at which said optical means is moved reciprocally with respect to said sample supporting member,
   c) a means for generating a timing signal that determines the timing, with which the sampling process is begun,
   d) a grid pattern, which is secured to either one of said sample supporting member and said optical means and which is constituted of a plurality of light reflecting members or light blocking members standing side by side with one another in the direction, along which said optical means is moved reciprocally with respect to said sample supporting member,
   e) a light projector, which is associated with the other of said sample supporting member and said optical means and which irradiates a light beam to said grid pattern,
   f) a light receiver for detecting the light beam, which has been reflected by said grid pattern, or the light beam, which has passed through said grid pattern,
   g) a means for sampling a light beam detection signal, which has been generated by said light receiver, in accordance with said pixel clock pulses and thereby generating a digital displacement signal, and
   h) a means for approximating the relationship between the order x, where $x=1, 2, 3, \ldots$, in which signal components of said digital displacement signal representing specific points appearing at equal pitches on said grid pattern occur, and the order y, in which said signal components of said digital displacement signal are sampled, with a quadratic equation $y=ax^2+bx+c$,
   determining the direction, in which a phase of a drive signal fed into said movement mechanism is shifted with respect to a phase of said timing signal, in accordance with whether the coefficient a in said quadratic equation is positive or negative, and thereafter shifting the phase of said drive signal with respect to the phase of said timing signal.

2. A scanning microscope as defined in claim 1 wherein said movement mechanism for moving said optical means or said sample supporting member is constituted of:
   a tuning fork on which said optical means or said sample supporting member is supported, and
   an excitation means for applying force, the magnitude of which changes periodically, to said tuning fork, and thereby causing said tuning fork to resonate.

3. A scanning microscope as defined in claim 2 wherein said excitation means is composed of an electromagnet for applying a magnetic field, the strength of which changes periodically, to said tuning fork, and a driving circuit for operating said electromagnet.

4. A scanning width detecting device for use in an apparatus provided with:
   i) a material, which is to be scanned,
   ii) a scanning means, and
   iii) a movement mechanism which reciprocally moves said scanning means with respect to said material such that said scanning means may linearly scan said material,
   the scanning width detecting device comprising:
   a) a grid pattern, which is combined with either one of said material and said scanning means and which is constituted of a plurality of light reflecting members or light blocking members standing side by side with one another at predetermined pitches in a direction, along which said scanning means is moved reciprocally with respect to said material,
   b) a light projector, which is combined with the other of said material and said scanning means and which irradiates a light beam to said grid pattern,
   c) a light receiver for detecting the light beam, which has been reflected by said grid pattern, or the light beam, which has passed through said grid pattern,
   d) a means for sampling a light beam detection signal, which has been generated by said light receiver, in accordance with predetermined sampling clock pulses and thereby generating a digital displacement signal, and e) a calculation means for approximating the relationship between the order x, where x=1, 2, 3, ..., in which signal components of said digital displacement signal representing specific points appearing at equal pitches on said grid pattern occur, and the order y, in which said signal components of said digital displacement signal are sampled, with a simple equation $y=ax+b$, multiplying the reciprocal of the coefficient a in said simple equation by a predetermined constant of proportionality, which is determined by time required for effective scanning and by the pitches of said light reflecting members or said light blocking members, and thereby finding a scanning width in the effective scanning.

5. A scanning width detecting device as defined in claim 4 wherein said movement mechanism for moving said material or said scanning means is constituted of:

a tuning fork on which said material or said scanning means is supported, and an excitation means for applying force, the magnitude of which changes periodically, to said tuning fork, and thereby causing said tuning fork to resonate.

6. A scanning width detecting device as defined in claim 5 wherein said excitation means is composed of an electromagnet for applying a magnetic field, the strength of which changes periodically, to said tuning fork, and a driving circuit for operating said electromagnet.

7. A magnification indicating apparatus for a scanning microscope provided with:

i) a sample, ii) a probe, and iii) a movement mechanism which reciprocally moves said probe with respect to said sample such that said probe may linearly scan said sample, the magnification indicating apparatus for a scanning microscope comprising:

a) a scanning width detecting device as defined in claim 4, b) a means for calculating a magnification of an image reproduction width in a microscope image reproducing means, which image reproduction width is taken in the direction of said scanning, with respect to the scanning width, which has been found by said scanning width detecting device, and c) an indicating means for indicating the magnification, which has thus been calculated.

8. A magnification indicating apparatus as defined in claim 7 wherein said movement mechanism for moving said sample or said probe is constituted of:

a tuning fork on which said sample or said probe is supported, and an excitation means for applying force, the magnitude of which changes periodically, to said tuning fork, and thereby causing said tuning fork to resonate.

9. A magnification indicating apparatus as defined in claim 8 wherein said excitation means is composed of an electromagnet for applying a magnetic field, the strength of which changes periodically, to said tuning fork, and a driving circuit for operating said electromagnet.

* * * * *